(12) United States Patent
LaPree et al.

(10) Patent No.: US 7,946,160 B2
(45) Date of Patent: May 24, 2011

(54) PORTABLE EMISSIONS MEASUREMENT ADAPTER DEVICE

(75) Inventors: Larry A. LaPree, Hartland, MI (US); Robert L. Brendel, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 153 days.

(21) Appl. No.: 12/248,097

(22) Filed: Oct. 9, 2008

(65) Prior Publication Data

US 2010/0089138 A1    Apr. 15, 2010

(51) Int. Cl.
*G01M 15/10* (2006.01)

(52) U.S. Cl. .............. 73/114.71; 73/23.31

(58) Field of Classification Search .......... 73/114.69, 73/114.71, 23.31
See application file for complete search history.

(56) References Cited

U.S. PATENT DOCUMENTS

| | | | | |
|---|---|---|---|---|
| 3,603,155 A | * | 9/1971 | Morris et al. | 73/863.01 |
| 3,784,902 A | * | 1/1974 | Huber | 324/464 |
| 3,917,454 A | * | 11/1975 | Clark | 73/863.11 |
| 3,999,425 A | * | 12/1976 | Collin | 73/114.71 |
| 4,373,377 A | * | 2/1983 | Smith et al. | 73/23.31 |
| 5,105,651 A | * | 4/1992 | Gutmann | 73/23.31 |
| 5,410,907 A | * | 5/1995 | Strom et al. | 73/23.31 |
| 5,907,109 A | * | 5/1999 | Tedeschi | 73/864.73 |
| 6,062,092 A | * | 5/2000 | Weaver | 73/863.03 |
| 6,085,582 A | * | 7/2000 | Tripathi et al. | 73/114.71 |
| 6,148,656 A | * | 11/2000 | Breton | 73/23.31 |
| 6,308,130 B1 | * | 10/2001 | Vojtisek-Lom | 701/114 |
| 6,387,706 B1 | * | 5/2002 | Eden | 436/127 |
| 6,443,021 B2 | * | 9/2002 | Hanashiro et al. | 73/863.11 |
| 6,470,732 B1 | * | 10/2002 | Breton | 73/23.31 |
| 6,623,975 B1 | * | 9/2003 | Tefft et al. | 436/137 |
| 6,789,413 B2 | * | 9/2004 | Brazeau et al. | 73/116.02 |
| 7,059,205 B1 | * | 6/2006 | Weaver | 73/863.03 |
| 7,472,610 B2 | * | 1/2009 | Clerc et al. | 73/862.52 |
| 7,568,383 B2 | * | 8/2009 | Colvin et al. | 73/114.76 |
| 2003/0230081 A1 | * | 12/2003 | Waller | 60/312 |

* cited by examiner

*Primary Examiner* — Freddie Kirkland, III
(74) *Attorney, Agent, or Firm* — Quinn Law Group, PLLC

(57) ABSTRACT

A portable emissions measurement adapter device (PEMAD) for a vehicle exhaust system having an first exhaust pipe coupled to a second exhaust pipe defining an air inlet opening therebetween, includes an elongated tube having a first and a second end and adapted to fit through the second exhaust pipe to sealingly mate with the first exhaust pipe at the first end. The second end is adapted for operative connection to an emissions testing unit. No modification of the production vehicle is required to use the PEMAD.

17 Claims, 3 Drawing Sheets

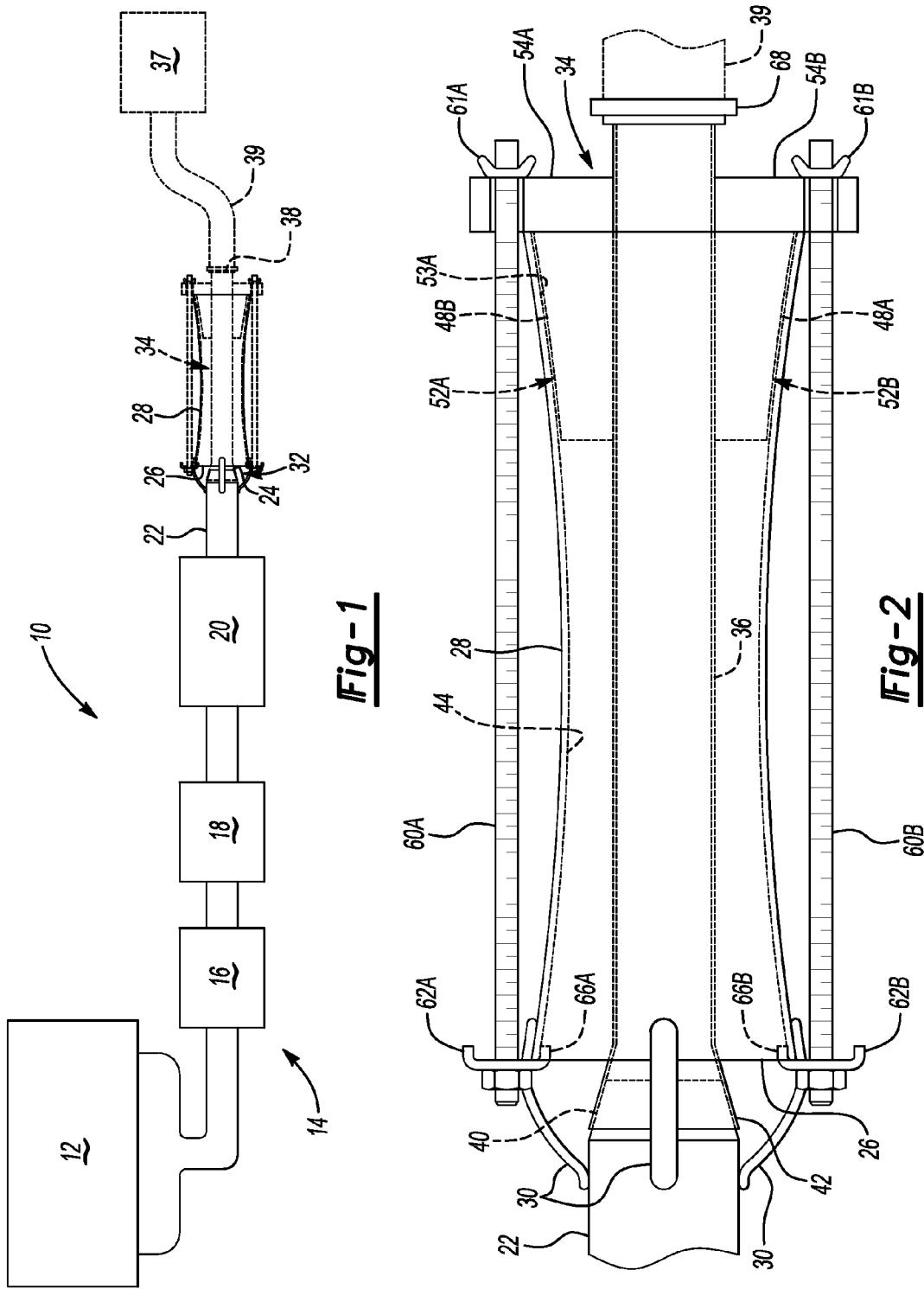

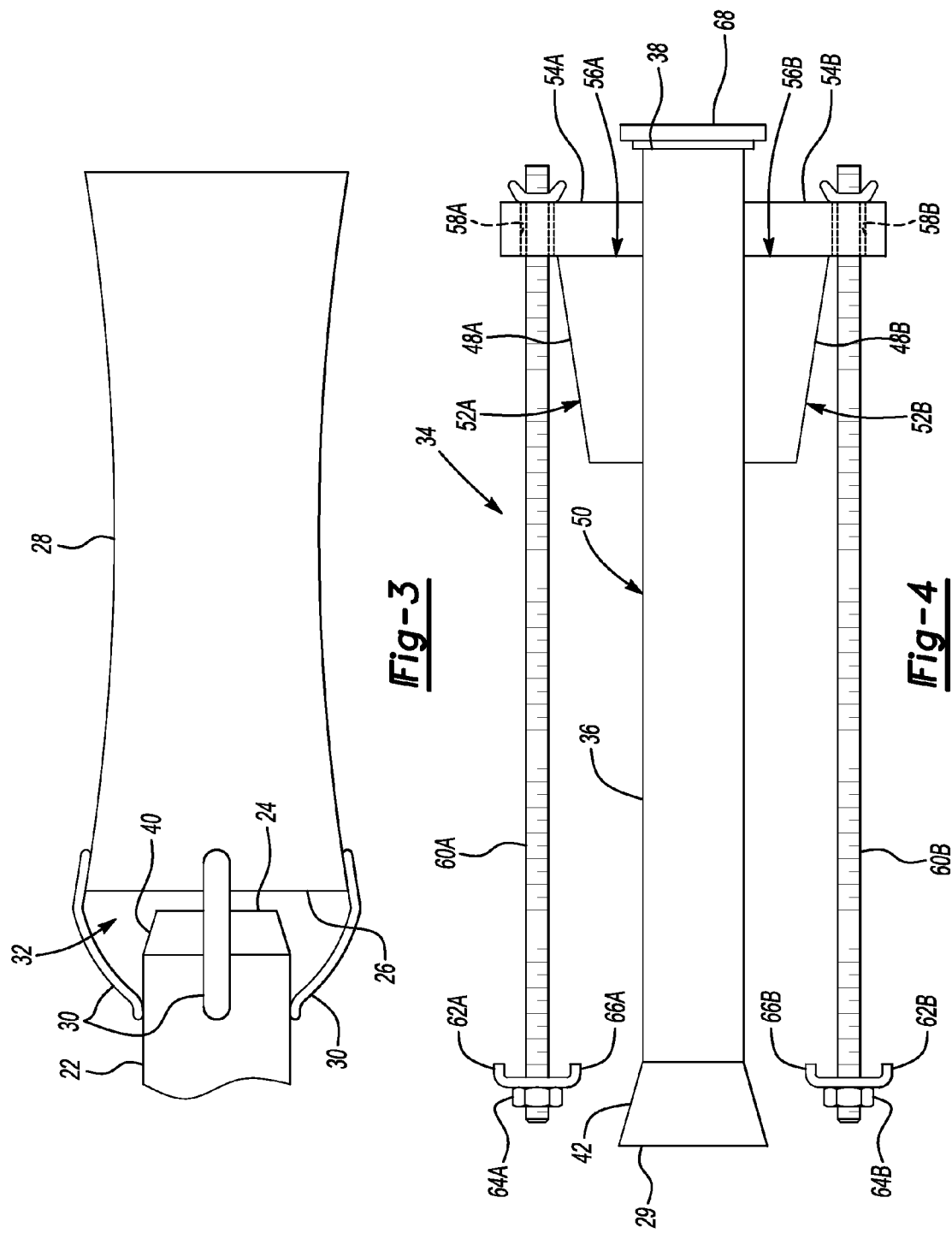

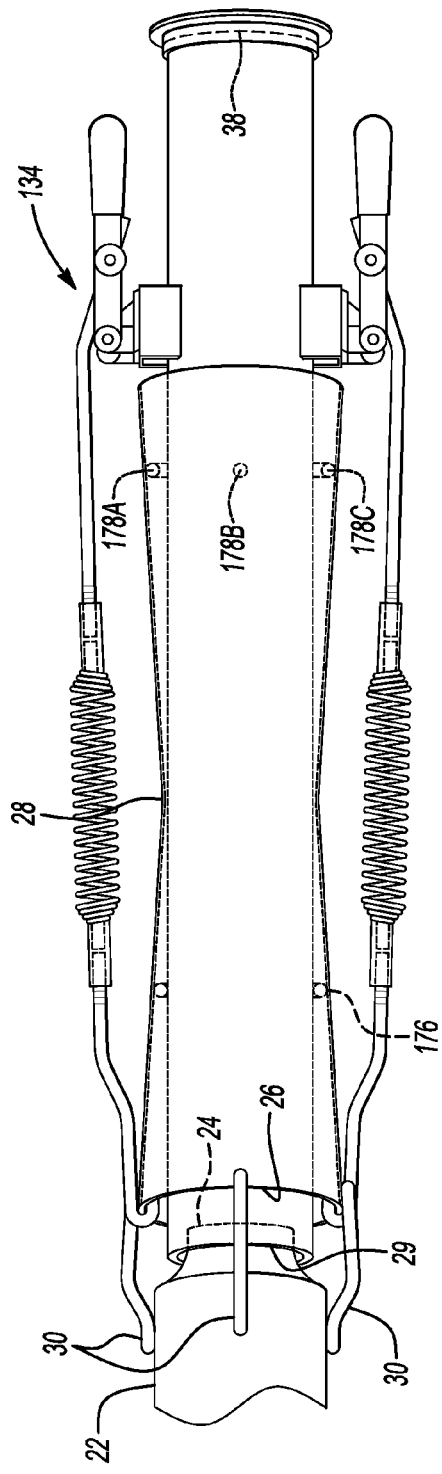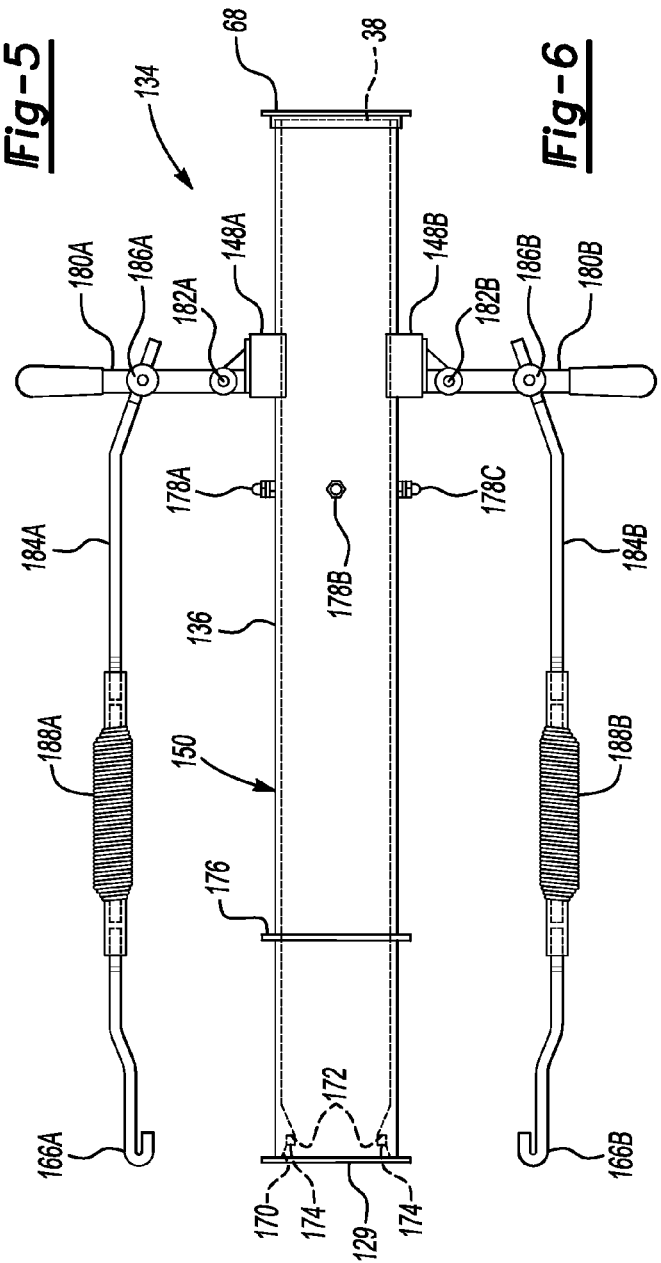

PORTABLE EMISSIONS MEASUREMENT ADAPTER DEVICE

TECHNICAL FIELD

The invention relates to a device for measuring emissions from an automotive exhaust system.

BACKGROUND OF THE INVENTION

Exhaust emissions from automotive vehicles are sometimes tested on production vehicles temporarily retrieved from an owner for performance of "in-use" testing. Some regulatory tests require that the vehicle be operated within a sealed shed, with the total emissions in the shed being monitored. Other tests may require emissions be captured at the tailpipe (also referred to as an exhaust pipe).

In order to mate the tailpipe with typical test measurement devices on current diesel exhaust systems, the passive exhaust cooler (PEC) is cut from the exhaust pipe, a flange is welded at the point of the cut, and a flanged tailpipe extension with a coupling flange is then bolted to the welded flange. The coupling flange may be a flange such as is available from Marmon-Herrington Company, Louisville, Ky., and that is commonly referred to as a Marmon flange by those skilled in the art. The diesel exhaust testing unit is then coupled to the Marmon flange. At the conclusion of testing, the tailpipe must be replaced, and a PEC connected to the tailpipe to return the vehicle to production configuration prior to returning the vehicle to the owner.

SUMMARY OF THE INVENTION

A portable emissions measurement adapter device (PEMAD) is provided that can be easily secured to the vehicle for testing, allowing the emissions measuring unit to be operatively connected to the PEMAD without requiring any modification to the production vehicle, including the production vehicle exhaust system. Removal is simple, allowing for repeated use of the PEMAD on different vehicles for high volume testing. The PEMAD is particularly well suited to a diesel exhaust system that has first and second pipes connected with one another with a gap in between the pipes that draws in ambient air. For example, the PEMAD is particularly suited for a diesel exhaust pipe spaced from a cooler pipe to define a venturi flow opening therebetween.

Accordingly, a portable emissions measurement adapter device (PEMAD) for a vehicle exhaust system that has a first exhaust pipe coupled to a second exhaust pipe defining an air inlet opening therebetween, includes an elongated tube having a first and a second end and adapted to fit through the second exhaust pipe to sealingly mate with the first exhaust pipe at the first end. The second end is adapted for operative connection to an emissions testing unit. The vehicle exhaust system may be for a diesel engine and the second exhaust pipe may be a passive exhaust cooler pipe (PEC) with the air inlet opening being a venturi flow opening. Hook members may be configured to secure the tube to the second exhaust pipe when the first end is sealingly mated with the first exhaust pipe. The second end may have a flared flange, such as a Marmon flange, for operative connection to the emissions testing unit.

In one embodiment, the first exhaust pipe is characterized by an inward tapered portion, and the tube is characterized by a complementary outward flared portion at the first end so that the first end is mated directly to the tapered exhaust pipe. Centering brackets may be provided on an outer surface of the tube that are configured to seal to an inner surface of the second exhaust pipe. Threaded rods may be operatively connected to the hook members and extending through openings in a plate or plates welded to the centering brackets. Tightening of the nuts on the threaded rods further secures the hooks.

In another embodiment, the tube has a narrowed opening at the first end with a stepped seat configured to abut the first exhaust pipe. A gasket may be provided at the stepped seat, so that the first exhaust pipe abuts the stepped seat at the gasket. A ring may be connected to an outer surface of the tube between the first and second ends for centering the tube within the second exhaust pipe. A plurality of biasing devices may be spaced about an outer circumference of the tube for centering and supporting the tube within the second exhaust pipe. Latch members may be pivotably connected to the tube, with arms connected to the latch members outward of the tube. Springs may operatively connect the hook members to the arms so that the hook members are tightened to the end of the second exhaust pipe by the springs and arms when the latch members are pivoted.

Accordingly, a method of measuring diesel exhaust emissions on a vehicle having an exhaust pipe and a cooler pipe, with an outlet of the exhaust pipe spaced from an inlet of the cooler pipe to define a venturi flow opening, includes extending a tube of an adapter device through the exhaust cooler pipe, abutting a first end of the tube to the exhaust pipe to seal the tube to the exhaust pipe, hooking arms secured to the tube to an end of the cooler pipe so that the adapter device is supported by the cooler pipe, and fitting an emissions measuring unit to the second end of the tube.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration of a diesel vehicle exhaust system with a first embodiment of a portable emissions measurement adapter device mounted to an exhaust pipe and supported by a cooler pipe for capturing exhaust in an emissions testing unit;

FIG. 2 is a schematic side view illustration of the portable emissions measurement adapter device of FIG. 1 mounted to the exhaust pipe and supported by the cooler pipe;

FIG. 3 is a schematic side view illustration of the exhaust pipe and cooler pipe of FIGS. 1 and 2 without the portable emissions measurement adapter device mounted thereto;

FIG. 4 is a schematic side view illustration of the portable emissions measurement adapter device of FIGS. 1 and 2 not mounted to the exhaust pipe;

FIG. 5 is a schematic side view illustration of a second embodiment of a portable emissions measurement adapter device mounted to the exhaust pipe and supported by the cooler pipe; and FIG. 6 is a schematic side view illustration of the portable emissions adapter device of FIG. 5 not mounted to the exhaust pipe.

DESCRIPTION OF THE PREFERRED EMBODIMENTS

Referring to the drawings, wherein like reference numbers refer to like components, FIG. 1 shows a vehicle 10 having a diesel engine 12 coupled to an exhaust gas treatment system 14. The treatment system 14 includes a series of a catalyst 16, an abatement device 18 and a filter/burner 20. The exhaust system 14 is exemplary only; other exhaust systems having different components or a different order of components are also within the scope of the claimed invention. An exhaust pipe 22 tapers to an outlet 24 that is spaced from an inlet 26 of a passive exhaust cooler pipe 28. The exhaust pipe 22 and cooler pipe 28 are connected by multiple retainers 30 (shown in FIG. 2) that span the gap between the exhaust pipe 22 and the cooler pipe 28. The spacing of the outlet 24 and the inlet 26 creates a venturi affect, allowing ambient air to be drawn into the exhaust flow. Accordingly, the gap is referred to as a venturi flow opening 32 or air inlet opening (shown best in FIG. 3).

Referring to FIG. 2, a portable emissions measurement device adapter (PEMAD) 34 is shown in phantom extending through the cooler pipe 28 to seal at a first end 29 to the exhaust pipe 22. As further described below, the PEMAD can be quickly sealingly secured to the exhaust treatment system 14 to allow emissions measurement unit 37 (see FIG. 1) to capture the exhaust gas and measure emissions levels. The PEMAD can then be disconnected from the exhaust treatment system 14 after testing is completed. No modifications are required to the exhaust treatment system 14 to connect or disconnect the PEMAD. As further described below, a second end 38 of the PEMAD is quickly connectable to any configuration of an extension tube 39 to allow the testing unit 37 to be positioned as needed for operator convenience. Although shown adapted to an exhaust system of a diesel engine, the adapter is not necessarily limited to use on diesel exhaust systems.

Referring to FIGS. 2-4, the exhaust pipe 22 and cooler pipe 28 both with and without the PEMAD 34 connected thereto are shown in greater detail. Referring specifically to FIG. 4, the PEMAD 34 includes an elongated tube 36 that has a first end 29 adapted to seal the outlet 24 of the exhaust pipe 22. The tube 36 may be galvanized steel. As shown in FIG. 3, the exhaust pipe 22 has an inward tapered portion 40 (also referred to as a cone) tapering toward outlet 24. As shown in FIG. 4, the PEMAD 34 has an outward flared portion 42 flaring from the tube 36 to the first end 29. As shown in FIG. 2, the flared portion 42 seals over the tapered portion 40 when the tube 36 is extended through the opening 44 in the hollow cooler pipe 28. The flared portion 42 directly abuts the tapered portion 40 to form the seal. In one embodiment, the flare of outward flared portion 42 and the taper of tapered portion 40 are both 27 degrees.

Referring to FIG. 4, centering brackets 48A, 48B are welded to an outer surface 50 of the tube 36 substantially opposite one another. The centering brackets may be constructed from ⅜ inch thick "C" channel steel. After welding to the tube 36, the outer surfaces 52A, 52B of the brackets 48A, 48B are hand ground to fit to the inner surface 53A of the cooler pipe 28. The taper of the centering brackets 48A, 48B matches the taper of the inner surface 53A of cooler pipe 28. The centering brackets 48A, 48B with ground outer surfaces 52A, 52B keep the PEMAD 34 centered inside of the cooler pipe 28.

Flat steel plates 54A, 54B are welded to end faces 56A, 56B of the brackets 48A, 48B. Alternatively, a single plate with an opening adapted to fit over the tube 36 could be used instead. Openings 58A, 58B are drilled in the plates 54A, 54B. Threaded rods 60A, 60B are inserted through the openings 58A, 58B. For example, the rods 60A, 60B may be ⅜ inch by 18 inches long. Wing nuts 61A, 61B secure the rods 60A, 60B at the openings 58A, 58B. Alternatively, hex nuts could be used. Hook members 62A, 62B are threaded onto the rods 60A, 60B opposite the plates 58A, 58B and are secured with hex nuts 64A, 64B. The hooks 62A, 62B may be ⅜ inch by one inch "L" channel steel drilled with openings to accommodate the threaded rods 60A, 60B.

As illustrated in FIG. 2, inner arm portions 66A, 66B of the hook members 62A, 62B are secured over the cooler pipe 28 at the inlet 26 to secure the rods 60A, 60B and attached plates 54A, 54B to the pipe 28, thereby further securing the entire PEMAD 34 to the cooler pipe 28. The hex nuts 64A, 64B are adjusted on the rods 60A, 60B to sufficiently tighten the hook members 62A, 62B to the cooler pipe 28.

A flared flange 68 is coupled to the second end 38 of the tube 36. The flange 68 is commonly referred to as a Marmon flange. A clamp such as a Marmon flange clamp may be used to couple the extension tube 39 to the flange 68. Other types of flanges or connecting devices suitable for connection to the extension tube 39, or directly to the testing unit 37 may also be used.

Referring to FIGS. 5 and 6, another embodiment of a PEMAD 134 is shown mated to the exhaust pipe and cooler pipe 28. Components identical to those of PEMAD 34 are referred to with identical reference numbers. In this embodiment, rather than having a flared portion 42, the tube 136 has a narrowed opening 170 at the first end 129. The tube forms a stepped seat 172, with an optional gasket 174 secured to the seat 172. When the tube 136 is inserted through the pipe 28, as shown in FIG. 5, the end of the exhaust pipe 22 at outlet 24 abuts the stepped seat 172 and is sealed thereto. The gasket 174 adds to the sealing ability.

The PEMAD 134 is also equipped with a centering ring 176 secured to the outer surface 150 of the tube 136 between the ends 129 and 38. The centering ring 176 is a rolled steel ring. The slight protuberance of the centering ring 176 from the outer surface 150 helps to pilot the tube within the cooler pipe 28.

Biasing devices (three shown) 178A, 178B, 178C are spaced circumferentially around the outer surface 150 of the tube 136 and are spring-loaded to bias the tube 136 away from the inner surface of the cooler pipe 28 when the tube 136 is inserted in the cooler pipe 28. The biasing devices 178A-178C may be what are commonly referred to as stubby plungers. Thus, the biasing devices 178A-178C (and other devices spaced therefrom but not visible in FIG. 5) center the tube 136 within the cooler pipe 28. Additionally, when the extension tube 39 and testing unit 37 are connected to the PEMAD 134, the devices 178A-178C help to support the tube 136 within the pipe 28.

Referring to FIG. 6, brackets 148A, 148B are welded to the outer surface 150 of the tube 136. Latch members 180A, 180B are pivotably connected to the brackets 148A, 148B via pivot pins 182A, 182B. Arms 184A, 184B are pivotably attached to the latch members 180A, 180B at pivot points 186A, 186B. Springs 188A, 188B secure hook members 166A, 166B to the arms 184A, 184B. As shown in FIG. 5, the hook members 166A, 166B may be hooked over the inlet 26 of the cooler pipe 28 after the tube 136 is inserted through pipe 28 with end 24 seated at stepped seat 172. The latch members 180A, 180B are then pivoted toward second end 38, as shown in FIG. 5, tensioning the springs 188A, 188B to further secure the hook members 166A, 166B to the tube 136.

While the best modes for carrying out the invention have been described in detail, those familiar with the art to which this invention relates will recognize various alternative designs and embodiments for practicing the invention within the scope of the appended claims.

The invention claimed is:

1. A portable emissions measurement adapter device (PE-MAD) selectively connectable to a vehicle; wherein the vehicle has a vehicle exhaust system having a first exhaust pipe coupled to a second exhaust pipe, the pipes defining an air inlet opening therebetween, comprising:
an elongated tube having a first and a second end and adapted to fit through the second exhaust pipe and through the air inlet opening to sealingly mate with the first exhaust pipe at the first end to seal the first exhaust pipe from the air inlet opening so that exhaust flows from the first exhaust pipe to the elongated tube without mixing with air at the air inlet opening, and with the second end adapted for coupling to an emissions testing unit.

2. The PEMAD of claim 1, wherein the vehicle exhaust system is for a diesel engine and the second exhaust pipe is a passive exhaust cooler pipe (PEC) with the air inlet opening being a venturi flow opening.

3. The PEMAD of claim 1, wherein the first exhaust pipe is characterized by an inward tapered portion; and wherein the tube is characterized by a complementary outward flared portion at the first end so that the first end is mated directly to the tapered first exhaust pipe.

4. The PEMAD of claim 1, further comprising:
centering brackets on an outer surface of the tube and configured to seal to an inner surface of the second exhaust pipe.

5. The PEMAD of claim 4, further comprising:
at least one plate attached to the centering bracket and having openings;
hook members configured to secure the tube to the second exhaust pipe when the first end is sealingly mated with the first exhaust pipe; and
rods operatively connected to the hook members and extending through the openings in the at least one plate.

6. The PEMAD of claim 1, wherein the tube has a narrowed opening at the first end with a stepped seat configured to abut the first exhaust pipe.

7. The PEMAD of claim 6, further comprising:
a gasket at the stepped seat.

8. The PEMAD of claim 1, further comprising:
a ring at an outer surface of the tube between the first and second ends for centering the tube within the second exhaust pipe.

9. The PEMAD of claim 1, further comprising:
a plurality of biasing devices spaced about an outer circumference of the tube for centering and supporting the tube within the second exhaust pipe; wherein the biasing devices are configured to contact the second exhaust pipe when the tube is fit through the second exhaust pipe.

10. The PEMAD of claim 1, further comprising:
hook members configured to secure the tube to the second exhaust pipe when the first end is sealingly mated with the first exhaust pipe.

11. The PEMAD of claim 10, further comprising:
latch members pivotably connected to the tube;
arms connected to the latch members outward of the tube;
springs operatively connecting the hook members to the arms; and
wherein the hook members are tightened to the end of the second exhaust pipe by the springs and arms when the latch members are pivoted.

12. The PEMAD of claim 1, wherein the second end has a flared flange.

13. A portable emissions measurement adapter device (PEMAD) for a diesel exhaust system having an exhaust pipe coupled to a passive exhaust cooler pipe to define a venturi flow opening therebetween, comprising:
an elongated tube having a first and a second end and adapted to fit through the cooler pipe to sealingly mate with the exhaust pipe at the first end with the second end adapted for coupling to an emissions measurement testing device;
wherein the tube has a narrowed opening at the first end with a stepped seat configured to abut the exhaust pipe;
hook members configured to hook over the end of the cooler pipe when the first end of the tube is sealingly mated with the exhaust pipe;
latch members pivotably operatively connected to the tube;
arms pivotably connected to the latch members outward of the pivot point; and
springs operatively connecting the hooks to the arms;
wherein the hooks are tightened to the end of the cooler pipe by the springs and arms when the latch members are pivoted.

14. The PEMAD of claim 13, further comprising:
a ring at an outer surface of the tube between the first and second ends for centering the tube within the cooler pipe.

15. The PEMAD of claim 13, further comprising:
a plurality of biasing devices spaced about an outer circumference of the tube for centering and supporting the tube within the cooler pipe.

16. A method of measuring diesel exhaust emissions on a vehicle having an exhaust pipe and a cooler pipe, with an outlet of the exhaust pipe spaced from an inlet of the cooler pipe to define a venturi flow opening, comprising:
extending a tube of an adapter device through the exhaust cooler pipe;
abutting a first end of the tube to the exhaust pipe to seal the tube to the exhaust pipe;
hooking arms secured to the tube to an end of the cooler pipe so that the adapter device is supported by the cooler pipe; and
fitting an emissions measuring unit to second end of the tube.

17. The method of claim 16, further comprising:
unhooking the arms from the cooler pipe; and
removing the adapter device from the vehicle.

* * * * *